Aug. 25, 1970 KYONGMIN KIM 3,525,637
METHOD OF PRODUCING LAYERS FROM THE INTERMETALLIC
SUPERCONDUCTING COMPOUND NIOBIUM-TIN ($Nb_3Sn$)
Filed July 12, 1967
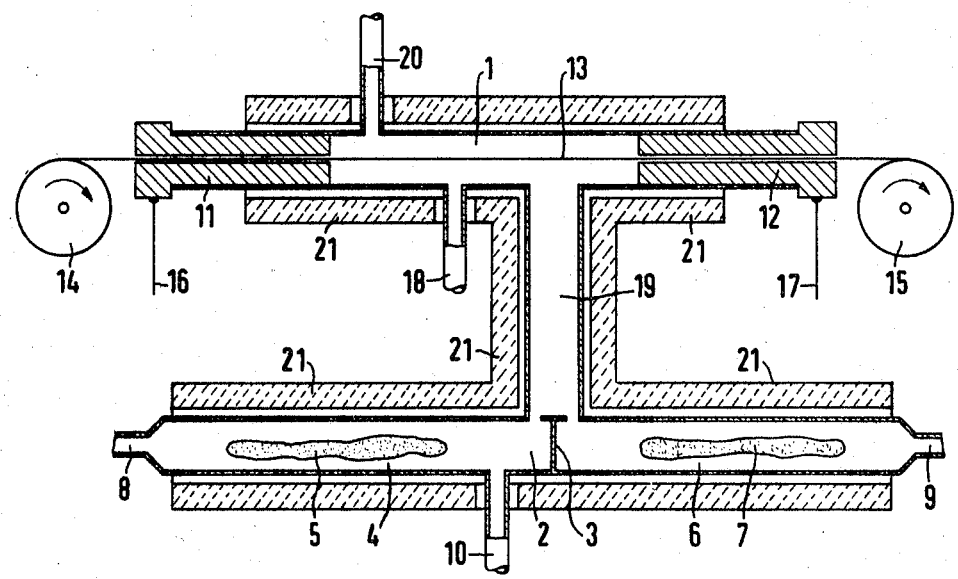

3,525,637
METHOD OF PRODUCING LAYERS FROM THE INTERMETALLIC SUPERCONDUCTING COMPOUND NIOBIUM-TIN (Nb₃Sn)

Kyongmin Kim, Erlangen, Germany, assignor to Siemens Aktiengesellschaft, Berlin and Munich, Germany, a corporation of Germany
Filed July 12, 1967, Ser. No. 652,763
Claims priority, application Germany, July 16, 1966,
S 104,847
Int. Cl. C23c 11/08, 17/02
U.S. Cl. 117—227                                   2 Claims

ABSTRACT OF THE DISCLOSURE

Described is an improvement in the method of producing layers of the intermetallic superconducting compound niobium-tin ($Nb_3Sn$) on a carrier, by passing chlorine over heated niobium to produce gaseous niobium tetrachloride and separately passing chlorine over heated tin to produce tin chloride and subsequently mixing the chlorides in a reaction vessel, and reducing them upon a heated carrier, by hydrogen, to which hydrogen chloride gas has been added. The improvement comprises adding chlorine to the niobium tetrachloride to at least partly convert said niobium tetrachloride into niobium pentachloride, prior to admixture with the tin chloride. The amount of chlorine added to the niobium tetrachloride is 10 to 20% the amount of chlorine passed over the heated niobium.

---

The present invention relates to a method for the production of layers from the intermetallic, superconducting compound niobium-tin, $Nb_3Sn$, on a carrier. In a known process intended particularly for coating wire and tape-shaped carriers with niobium-tin, chlorine gas is first passed over heated niobium whereby gaseous niobium tetrachloride ($NbCl_4$) is produced. In a separate process, gaseous tin chloride is obtained by passing gaseous chlorine over heated tin. The chlorides are subsequently mixed and reduced by hydrogen, on a heated carrier within a reaction vessel, by adding hydrogen chloride gas (see the article by J. J. Hanak, K. Strater, G. W. Cullen in "RCA Review," Sept. 1964, p. 342–365).

A great difficulty associated with this method is attributable to the fact that not only $Nb_3Sn$ precipitates on the heated carrier but also a precipitation is formed on the walls of the reaction vessel. The latter precipitation may easily clog up the apparatus, particularly the gas inlets. As a result, the process may be continued undisturbed only for relatively short periods of time and, thus, only short wire or tape pieces may be coated with niobium-tin. The distributing precipitation constitutes partly $Nb_3Sn$ and predominantly niobium trichloride ($NbCl_3$). To reduce such precipitation, the known methods aim to select appropriate temperatures for the carrier and the wall of the respective reaction vessel, and to add gaseous hydrogen chloride to the gas mixture. The carrier is thus heated to approximately 1000° C., while the wall of the surrounding reaction vessel is heated to approximately 700° C. As tests have shown, while these measures largely prevent the precipitation of $Nb_3Sn$ at the wall of the reaction vessel, the $NbCl_3$ precipitation, however, which predominates as to amount, is far from completely eliminated. The remaining precipitation has a very detrimental effect over several days, especially during the process of coating very long wires or tapes with niobium-tin.

Thus, the task at hand is to improve the method for producing $Nb_3Sn$ layers in such a way, that $NbCl_3$ precipitations will be prevented.

In accordance with the present invention, this problem is solved by producing the gaseous niobium tetrachloride ($NbCl_4$) by passing chlorine gas over heated niobium and converting at least part of the gas into niobium pentachloride ($NbCl_5$), prior to admixture with the tin chloride, by adding gaseous chlorine. By adding chlorine gas to $NbCl_4$, prior to its being mixed with the tin chloride, and partially converting $NbCl_4$ into $NbCl_5$, the disturbing $NbCl_3$ precipitations, surprisingly, are virtually eliminated. This may be explained by assuming that the $NbCl_3$ occurs primarily by disproportioning the $NbCl_4$ into gaseous $NbCl_5$ and solid $NbCl_3$, according to the formula:

Through the buffer action of the $NbCl_5$, produced through the addition of chlorine to $NbCl_4$, the disproportionment of the $NbCl_4$ is completely suppressed. Another possiblity for the occurrence of $NbCl_3$ precipitation at the wall of the reaction vessel is through the reaction:

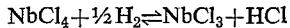

This reaction, too, which is adso buffered by the addition of the hydrogen chloride, is largely suppressed in the method according to the present invention, since the resulting $NbCl_3$ is again converted into gaseous $NbCl_4$ by means of the $NbCl_5$, according to the formula 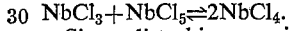

Since disturbing precipitation does not occur at the wall of the reaction vessel, the method of the present invention makes it possible to coat continuously, over long periods, wires and tapes with $Nb_3Sn$. My method also ensures a constant ratio between niobium chloride and tin chloride in the gas mixture to be reduced and thus a reproducible stoichiometric $Nb_3Sn$ precipitation.

It was found particularly advantageous to have the chlorine gas amount, admixed to the $NbCl_4$, such that it is approximately 10 to 20% of the chlorine gas which is passed over the heated niobium. By adding this amount of chlorine gas, enough $NbCl_5$ is produced so that the added chlorine is completely converted and that no free chlorine will reach the reaction vessel.

The hydrogen chloride gas is preferably introduced into the reaction vessel, together with the hydrogen, according to the present method. This further prevents the precipitation of $Nb_3Sn$ at the vessel walls.

The invention will be further illustrated by an embodiment example and the drawing in which:

The figure is a schematic top view of a device for performing the method of the present invention.

The apparatus consists essentially of a reaction vessel constituting a quartz tube 1 and a second quartz tube 2 which is subdivided by means of a quartz wall 3. One portion 4 of the tube 2 is for storing the niobium 5 while the apparatus is in operation, and serves as the niobium chlorinator. The other part 6 of the tube 2, for storing the tin 7 while the apparatus is in operation, serves as the tin chlorinator. At both ends, the tube 2 is provided with inlets 8 and 9 for introducing the chlorine gas. Downstream of the niobium supply 5, another inlet pipe 10 for chlorine is provided at portion 4 of pipe 2. The quartz wall 3 prevents the flow of gas from portion 4 of the pipe 2 into portion 6 and vice versa.

The reaction pipe 1 is sealed at both ends by graphite bodies 11 and 12 which are equipped with very narrow openings for introducing the wire or tape-shaped carrier 13. The latter is unwound from the roll 14 and, following the coating with $Nb_3Sn$, is wound onto the motor-driven take-up roll 15. The carrier 13 is in conductive connection with the graphite bodies 11 and 12 which are attached to an electrical current source via leads 16 and 17. Inlet 18 is used for introduction of hydrogen into the reaction vessel 1. The reaction vessel 1 is connected with the quartz tube 2 via the quartz tube 19. The exhaust gases resulting from the reaction process are removed from the reaction vessel by outlet 20. Quartz tubes 1, 2 and 19 are surrounded by appropriately formed, for example collapsible, electrical resistance pipe furnaces 21 comprising ceramic bodies with electrical resistance wires therein, which can heat individual portions of the apparatus to varying temperatures. On the outside the furnace is surrounded by an aluminum housing.

The following embodiment serves to illustrate the coating of a metal band with niobium-tin with the aid of the device illustrated in the figure.

First of all, the starting materials niobium and tin are inserted into the niobium chlorinator 4 and into the tin chlorinator 6. Furthermore, the metal tape 13 which consists, for example, of a molybdenum-nickel alloy containing for example 62% nickel, is appropriately led into the quartz tube 1 and pulled through said tube at a constant speed. Electrical current is conducted through the tape 13 via leads 16 and 17. The current is such that the tape is heated to an approximate temperature of 950–1000° C. With the aid of pipe furnaces 21, the wall of the reaction vessel 1 is heated to about 730° C., the niobium chlorinator 4 to about 900° C., the tin chlorinator 6 to about 800° C., and the connecting pipe 19, to prevent condensation of the chlorides, to about 650° C. After purging the apparaus of air, for example by inert gas, gaseous chlorine is introduced through inlet 8 into the niobium chlorinator 4 and through inlet 9 into the tin chlorinator 6. By passing chlorine gas over the heated niobium 5, gaseous $NbCl_4$ is formed. By passing chlorine gas over the melted tin 7, gaseous $SnCl_2$ is formed. Downstream of the niobium supply 5, chlorine gas is also introduced through inlet 10, into the niobium chlorinator 4. This partially converts $NbCl_4$ into $NbCl_5$. The chlorides of niobium and tin flow through the tube 19 into the reaction vessel. Simultaneously, hydrogen, to which hydrogen chloride is added, is passed to the reaction vessel 1 through inlet 18. The hydrogen reduces the chlorides of niobium and tin at the hot tape 13 which becomes coated with a layer of $Nb_3Sn$. The coated tape is led out from the reaction tube 1 and wound upon the roll 15. The exhaust gases are removed through outlet pipe 20.

The amounts of gas needed per time unit depend upon the chlorinating conditions and reduction reactions, i.e. on the temperatures in the individual portions of the apparatus, upon the dimensions of the apparatus as well as the transport rate of the carrier and the desired thickness of the niobium-tin layer to be produced thereon. In the present example, the niobium chlorinator 4 and the tin chlorinator 6 are each about 40 cm. long and the connecting pipe 19 is approximately 20 cm. long. The length of the reaction chamber in the pipe 1 is about 30 cm. The tubes 1, 2 and 19 all have the same diameter, that is about 4 cm. The throughput of chlorine gas through the niobium chlorinator 4 was about 4 l./h. and through the tin chlorinator 6 was about 8 l./h. The amount of chlorine inserted through the inlet pipe 10 was about 0.5 l./h., i.e. about 12.5% of the amount of chlorine inserted into the inlet pipe 8. About 10 l./h. hydrogen were needed to reduce the chlorides. About 2 l./h. hydrogen chloride gas were added to the hydrogen. The tape 13 was pulled through the pipe 1 with a speed of about 3 mm./sec. and thereby coated with a cover of niobium-tin of about 8 µm. thickness. Even during operational processes lasting several days, no disturbing precipitations occurred at the walls of the reaction vessel.

The method is suitable, aside from its use for continuous coating of wires and tapes employed particularly for superconducting coils, also for coating structural components which are firmly installed inside the reaction vessel.

I claim:

1. In the method of producing layers of the intermetallic superconducting compound niobium-tin ($Nb_3Sn$) on a carrier, by passing chlorine over heated niobium to produce gaseous niobium tetrachloride and separately passing chlorine over heated tin to produce tin chloride and subsequently mixing the chlorides in a reaction vessel, and reducing them upon a heated carrier, by hydrogen, to which hydrogen chloride gas has been added, the improvement which comprises adding additional chlorine, downstream of the niobium supply, to the niobium tetrachloride to at least partly convert said niobium tetrachloride into niobium pentachloride, prior to admixture with the tin chloride thereby preventing formation of niobium trichloride.

2. The method of claim 1, wherein the amount of chlorine added to the niobium tetrachloride is 10 to 20% the amount of chlorine passed over the heated niobium.

References Cited

UNITED STATES PATENTS 3,020,148  2/1962  Jenkins et al. _____ 23—87 X
3,400,016  9/1968  Engstrom et al. _____ 117—227

OTHER REFERENCES

Hanak et al.: RCA Review, September 1964, pages 342 to 365, relied upon.

Powell et al.: Vapor Deposition, copyright May 10, 1966, pages 252 and 253, relied upon.

ALFRED L. LEAVITT, Primary Examiner

M. F. ESPOSITO, Assistant Examiner

U.S. Cl. X.R.

23—87; 29—599; 117—107.1, 107.2; 338—32